United States Patent [19]

Souza

[11] 4,030,230

[45] June 21, 1977

[54] ANIMAL TRAP AND PACKAGE THEREFOR

[75] Inventor: Anthony J. Souza, Lancaster, Pa.

[73] Assignee: Woodstream Corporation, Lititz, Pa.

[22] Filed: Apr. 6, 1976

[21] Appl. No.: 674,098

[52] U.S. Cl. .............................................. 43/81
[51] Int. Cl.² ..................................... A01M 23/30
[58] Field of Search ...................................... 43/81

[56] References Cited

UNITED STATES PATENTS

| | | | |
|---|---|---|---|
| 1,709,199 | 4/1929 | Thayer | 43/81 |
| 3,769,742 | 11/1973 | Spain et al. | 43/81 |

Primary Examiner—Louis G. Mancene
Assistant Examiner—Daniel J. Leach

[57] ABSTRACT

An animal trap, particularly a mouse trap or the like, in combination with a package therefor wherein the trap is normally urged into a collapsible container forming part of the package, such as a paper bag, by a resilient means in the form of a rubber band or the like, with a limited stop means being provided to temporarily maintain the trap outside the container until an animal triggers the trap at which time the impact causes the trap to jump the stop and be withdrawn into the container. The trap and the trapped animal are thus encased by the package and can be disposed of without contact by the user.

10 Claims, 8 Drawing Figures

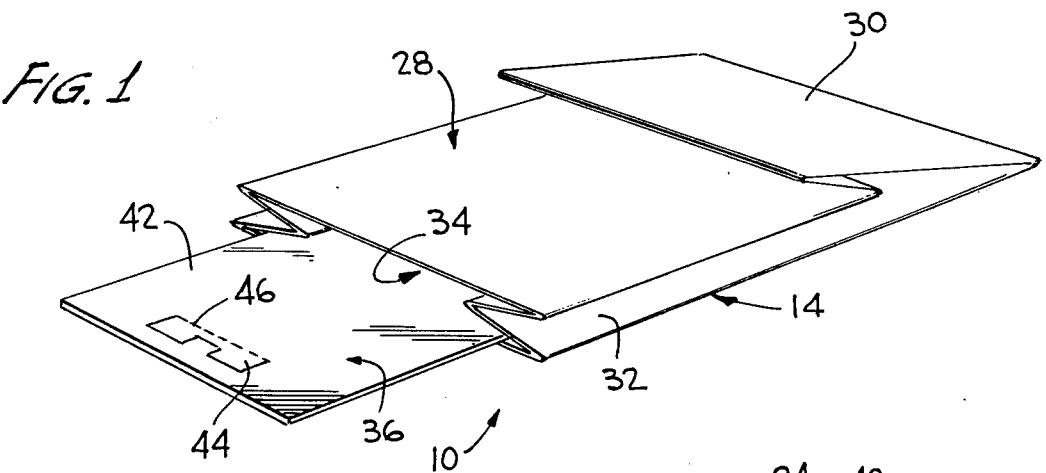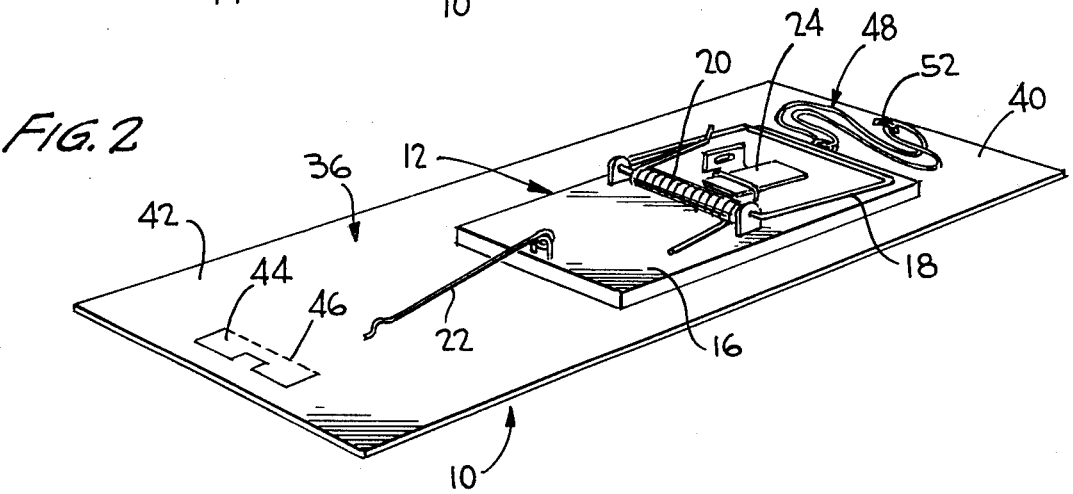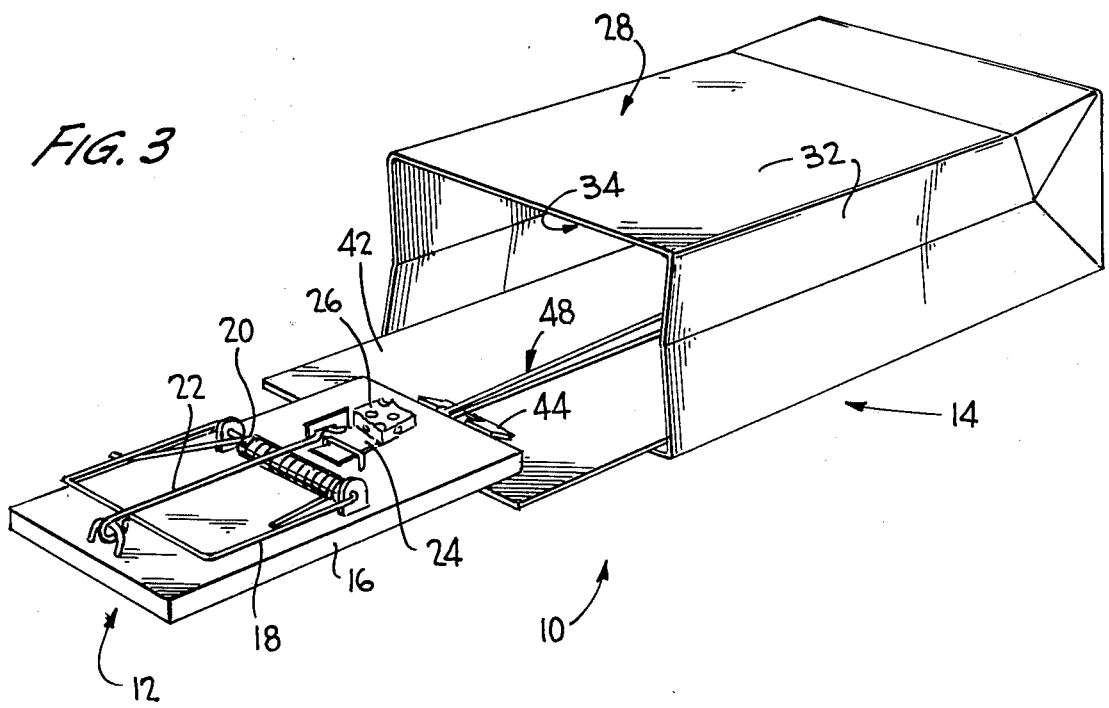

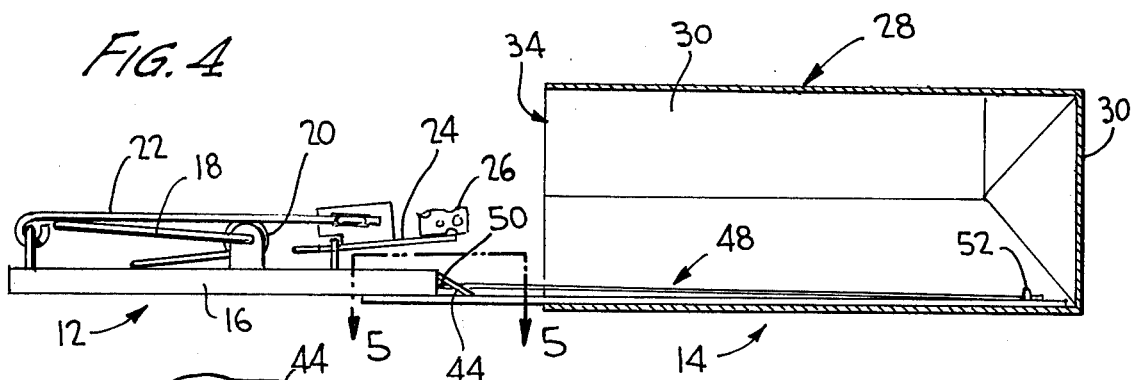
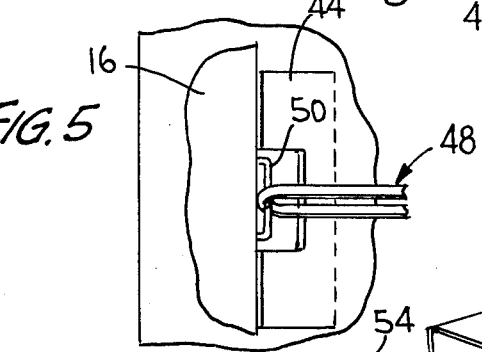
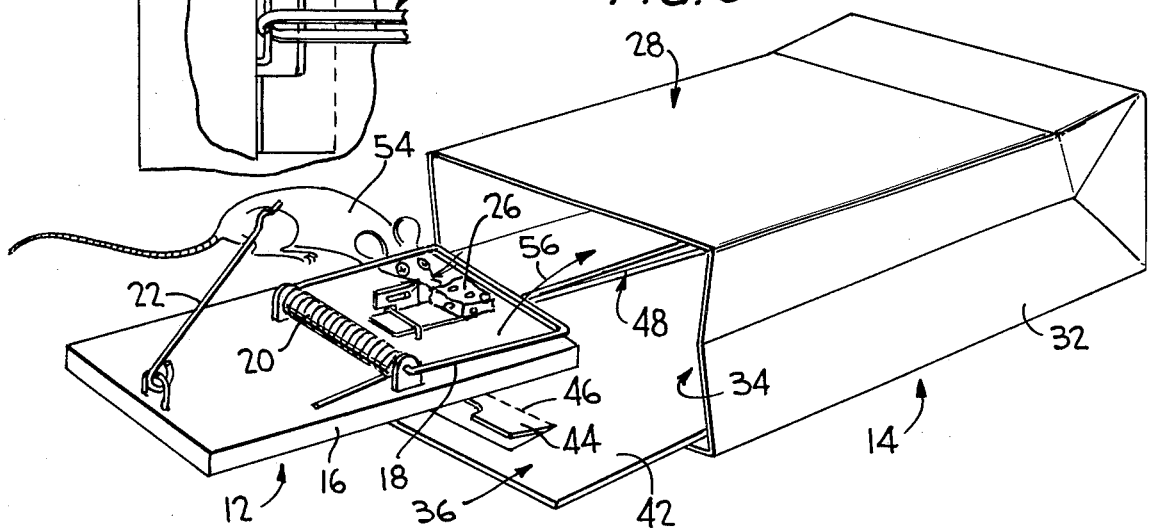
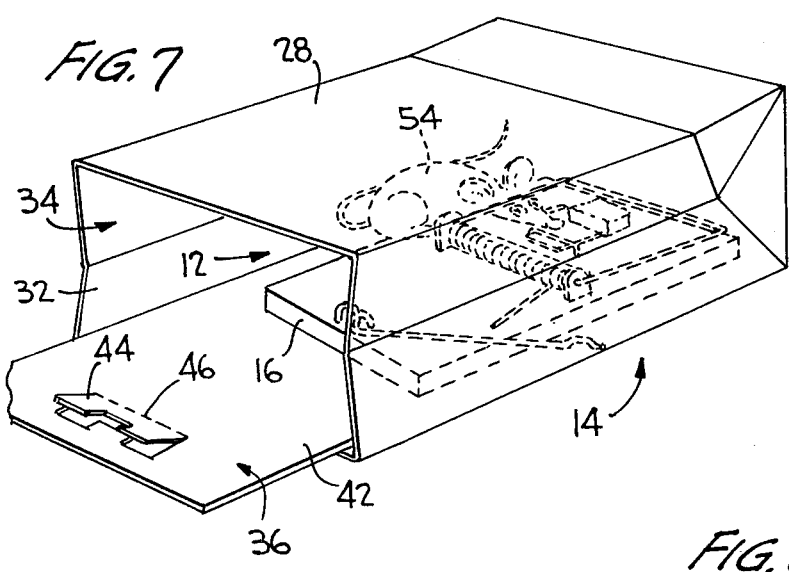
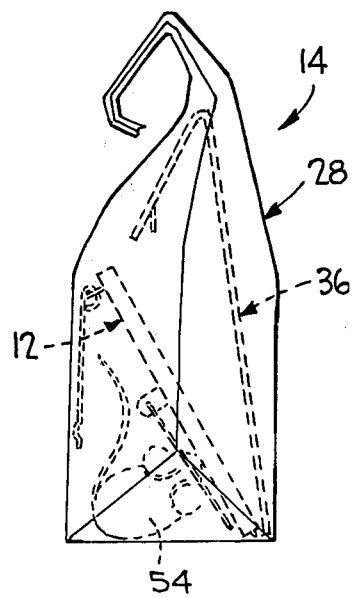

ANIMAL TRAP AND PACKAGE THEREFOR

This invention relates to an animal trap and package therefor and relates more particularly to a disposable mouse trap or the like.

Although the concept of this invention, from a commercial standpoint, is primarily related to a rodent trap, such as a mouse trap, and associated package, it will be readily understood that it could be utilized in association with traps for other animals. Thus, reference herein to a mouse trap or the like will be considered as directed to the preferred embodiment.

Although commercially available mouse traps are reusable, the trapping and killing of a mouse contaminates the trap, making such reuse undesirable. Moreover, the sight of a killed mouse in the trap is quite unaesthetic and the handling of the sprung trap with the trapped mouse is very undesirable.

It is therefore a primary object of this invention to provide a disposable mouse trap or the like, and more particularly, an assembly of a package and trap which obviates the need for the user to see the dead mouse after the trap has been sprung.

Another object of this invention is the provision of a mouse trap and package assembly which provides an attractive display for sale and which, in use, automatically encloses the sprung trap and the dead mouse so that the user need not see or touch either item.

Yet another object of this invention is to provide a composite trap and package which is simple and inexpensive in construction, easy to set up and use, and functionally highly effective.

Other and further objects reside in the combination of elements, arrangement of parts, and features of construction to be pointed out in more detail hereinafter with reference to the accompanying drawings wherein:

FIG. 1 is a perspective view of the package as it would be displayed for sale, the mouse trap being within the collapsed paper bag and therefore not seen in this view;

FIG. 2 is a view of the assembly with the container removed for illustrative clarity and convenience;

FIG. 3 is a perspective view of the mouse trap and package therefor with the container expanded and the trap in set position outside the container;

FIG. 4 is a side elevational view of the trap and package assembly of FIG. 3, with the container in crosssection;

FIG. 5 is a fragmentary enlarged elevational view taken substantially along lines 5—5 of FIG. 4;

FIG. 6 is a view similar to FIG. 3 showing the trap overriding the limited stop means when it is triggered in trapping a mouse;

FIG. 7 is a perspective view of the trap and package assembly after the trap and dead mouse have been withdrawn into the container by the resilient rubber band or the like, parts being shown in dotted lines for illustrious clarity; and FIG. 8 is a side elevational view of the package assembly folded for disposal.

Like reference characters refer to like parts throughout the several views of the drawings.

Referring now to the drawings in general, a combination animal trap and package therefor is designated generally by the reference numeral 10 and comprises basically an animal trap means 12 and a package means therefor 14.

Although the trap means 12 is shown in the drawings as a conventional mouse trap, it will be understood that the instant inventive concepts would be equally applicable in combination with other forms of animal trap means. However, in the embodiment shown the trap means 12 comprises basically a base means 16 in the form of a wooden rectangle to the upper surface of which is pivotally secured a U-shaped bail means 18 movable between a set position as shown particularly in FIGS. 3 and 4 and a sprung position as shown in particularity in FIGS. 2 and 6-8. Coiled spring means 20 normally urge the bail means 18 to the sprung positon, with a latching means 22 being operatively associable with a trigger means 24 in a well known manner to maintain the bail means 18 in the set position. The trigger means 24 may carry bait such as shown at 26 or may be pre-baited as is well known in the art.

The package means 14 comprises basically a collapsible container 28, illustratively shown as a paper bag having a closed bottom 30 and side walls 32 defining an open top 34 with the side walls 32 being creased or pre-folded in a conventional manner to enable the container 28 to be collapsed as shown in FIG. 1 or expanded as shown in FIG. 3. Additionally, a card means 36, formed of any suitable material such as cardboard or the like is part of the package means 14 and includes a bottom end portion 40 positioned within the container 28 in juxtaposition to the bottom 30 thereof, and a header end portion 42 extending beyond the top 34 of the container 28. The card means 36 may be secured as by adhesive or the like to the container 28, but need not be for most applications of the instant inventive concepts. The header end portion 42 of the card means 36 can have any desirable indicia thereon for display purposes as can the side wall 32 of the container 28.

A limited stop means 44 is defined on the header end portion 42 of the card means 36. In the preferred embodiment shown, this limited stop means 44 comprising a tab punched from the card on three sides, with the remaining side being hingedly secured to the card means 36 as shown by the dotted line at 46. Thus, the tab or limited stop means 44 can be pushed from the card means 36 as shown particularly in FIGS. 3-7 for a purpose to be described in more detail hereinafter.

A resilient means 48 in the form of a rubber band or the like has one end secured as at 50 by a staple or the like to the base means 16 of the animal trap 12, the other end of the resilient means 48 being secured in any conventional manner, such as by a staple or the like at 52 to the bottom end portion 40 of the card means 36. Note particularly FIGS. 2 and 4.

While staples have been shown for connecting the resilient means 48 to the trap means 12 and the card means 36, other forms of connecting means may be obviously be substituted therefor. Additionally, although the resilient means have been shown as attached to the end of the base means 16 of the trap 12, it could be attached to the bottom thereof and, likewise, could be attached at some other location toward the bottom end portion 40 of the card means 36.

The resilient means 48 is of such a length that it will be in stretched condition when the trap means 12 has been withdrawn from the container 28 and engaged against the raised tab 44 as shown particularly in FIGS. 3-5. Thus, the resilient means 48, in this position, will be urging the trap means toward withdrawal into the expanded container 28, although the engagement of the limited stop means 44 against the end of the base means 16 of the trap 12 precludes such withdrawal of the trap means 12 into the container 28. A notch has been shown in the tab 44 for receipt of the resilient means 48, although the design and construction of this element may be modified as desired.

It will be seen however, that the stop means 44 is of a limited nature, that is, it will secure the trap means 12 against withdrawal into the container 28 unless and until a force is applied to cause the trap means to jump or override the effect of the limited stop means 44. This force results from the triggering of the trap means 12 in trapping a mouse or the like as shown particularly in FIG. 6. When the trigger means 24 is contacted by an animal attempting to gain access to the bait 26, the latching means 22 is released in a well known manner and the bail means 18 moves from the set position shown in FIGS. 3 and 4 to the sprung position shown in FIGS. 6 and 7 to trap the mouse 54 between the bail means 18 and the upper surface of the base means 16 of the trap 12. The force of the bail means being sprung causes the trap 12 to jump sightly as illustrated by the arrow 56 in FIG. 6 thereby overriding the engagement of the limited stop means 44 and permitting the resilient means 48 to withdraw the trap means 12 and the mouse 54 into the container 28 as will be seen particularly in FIG. 7. Thus, once the trap is sprung, both the trap and the dead mouse are automatically withdrawn within the container 28. The user, upon discovering that the trap means has been sprung, can then collapse the container 28, either folding the header end portion 42 of the card means 36 within the container 28 as shown in FIG. 8 or folding the header outside the container, as desired. The result is that the trap and animal are readily enclosed within the container 28 and disposed of, with the user having no need to either see the dead animal or touch the contaminated trap.

Again, although a conventional mouse trap has been shown in the drawings it will be readily recognized that other forms of animal traps may be substituted therefor without departing from the instant inventive concepts. Likewise, although a paper bag has been shown as the container, other container means may be utilized as part of the package assembly. For example, the card means 36 can be incorporated as a part of the container and the overall assembly could be formed of paper, cardboard, plastic or other suitable material without significant modification.

Thus, it will now be seen that there has been herein provided an improved animal trap and package therefore which satisfies all of the objects of the instant invention as set forth hereinabove, and others, including many advantages of great practical significance and commercial importance The embodiments of the invention in which an exclusive property or privilege is claimed are defined as follows:

1. In combination, animal trap means and a package means therefor, said package means including a container portion, resilient means normally tending to withdraw said trap means into said container portion of said package means, and limited stop means forming part of said package means for temporarily maintaining said trap means outside said container portion of said package means, springing of said trap means in catching an animal overriding said limited stop means, whereby said trap means and the animal trapped thereby are automatically withdrawn into said container portion of said package means.

2. The combination of claim 1 wherein said trap means is a rodent trap.

3. The combination of claim 1 wherein said container portion of said package means is a paper bag.

4. The combination of claim 1 wherein said trap means includes a base means having an upper surface and opposed end portions, bail means pivotally secured to said upper surface of said base means intermediate said end portions for rotation between a set position and a sprung position, spring means normally biasing said bail means towards said sprung position, latching means for temporarily securing said bail means in said set position, and trigger means operatively associated with said latching means for disengaging said latching means upon contact of said trigger means by an animal to be trapped, whereby said bail means is rotated by said spring means from said set position into said sprung position to trap the animal between said bail means and said upper surface of said base means, said container portion of said package means having a closed bottom and side walls defining an open top, said side walls including means permitting said container to be expanded or collapsed, said package means further including a card means having a bottom end portion positioned within said container portion of said package means in juxtaposition to said bottom thereof, and a header end portion extending beyond said top of said container portion, said resilient means having a first end secured to said bottom end portion of said card means and a second end secured to said trap means, said limited stop means being defined on said header end portion of said card means, whereby said trap means can be removed from said container portion of said package means, and with said container side walls in an expanded condition, said base means of said trap means can be operatively engaged with said limited stop means with said resilient means in a stretched condition tending to withdraw said trap means into said container portion of said package means, and said bail means of said trap means can be moved to said set position, actuating of said trigger means by contact with an animal disengaging said latching means to release said bail means and permit same to be rotated by said spring means to said sprung position in which the animal is trapped, the force of engagement of said bail means with the animal causing said base means of said trap means to jump slightly and override said limited stop means whereby said trap means and the animal trapped thereby will be withdrawn by said resilient means into said container portion of said package means.

5. The combination of claim 4 wherein said trap means is a rodent trap.

6. The combination of claim 4 wherein said container portion of said package means is a collapsible paper bag.

7. The combination of claim 4 wherein said card means is formed of cardboard.

8. The combination of claim 4 wherein said limited stop means comprises a tab means defined by portions of said card means, said tab means being punched from said card means and including portions hingedly secured to said card means.

9. The combination of claim 8 wherein said tab means can be pushed from said card means into a position wherein it is engageable against one end of said base means to temporarily maintain said trap means out of said container portion of said package means.

10. The combination of claim 4 wherein said resilient means is a rubber band.

* * * * *